United States Patent [19]

Williams et al.

[11] Patent Number: 5,297,045
[45] Date of Patent: Mar. 22, 1994

[54] VEHICLE SUSPENSION SYSTEM

[75] Inventors: David. A. Williams, Stoney Stratford; Peter G. Wright, Wymondham, both of United Kingdom

[73] Assignee: Group Lotus plc, Norfolk, United Kingdom

[21] Appl. No.: 773,855

[22] PCT Filed: Apr. 23, 1990

[86] PCT No.: PCT/GB90/00621

§ 371 Date: Dec. 13, 1991

§ 102(e) Date: Dec. 13, 1991

[87] PCT Pub. No.: WO90/12699

PCT Pub. Date: Nov. 1, 1990

[30] Foreign Application Priority Data

Apr. 21, 1989 [GB] United Kingdom ............... 8909073

[51] Int. Cl.$^5$ ............................................. B60G 17/00
[52] U.S. Cl. .............................. 364/424.05; 280/707; 280/840
[58] Field of Search ................. 364/424.05; 280/707, 280/840

[56] References Cited

U.S. PATENT DOCUMENTS

| 4,579,366 | 4/1986 | Doi et al. ........................ 280/707 |
| 4,677,263 | 6/1987 | Hamilton et al. ............... 200/61.44 |
| 4,700,971 | 10/1987 | Doi et al. ........................ 280/707 |
| 4,787,649 | 11/1988 | Watanabe et al. .............. 280/707 |
| 4,801,155 | 1/1989 | Fukushima et al. ............ 280/707 |
| 4,825,370 | 4/1989 | Kurosawa ..................... 364/424.05 |
| 5,062,660 | 11/1991 | Satoh et al. .................... 280/707 |
| 5,141,245 | 8/1992 | Kamimura et al. ............. 280/707 |

FOREIGN PATENT DOCUMENTS

| 0114757A1 | 8/1984 | European Pat. Off. . |
| 0221486A3 | 5/1987 | European Pat. Off. . |
| 60-82420 | 5/1985 | Japan . |
| 60-148710 | 8/1985 | Japan . |
| 63-25118A | 2/1988 | Japan . |
| 63-116918 | 5/1988 | Japan . |

Primary Examiner—Gary Chin
Attorney, Agent, or Firm—Westman, Champlin & Kelly

[57] ABSTRACT

A vehicle suspension system includes a suspension unit comprising a hydraulic actuator of variable displacement connected to the chassis or body of the vehicle and a wheel and hub assembly of the vehicle and a control device for varying the displacement of the actuator in response to signals received from transducers on the vehicle to control the vehicle suspension. The suspension unit further comprises a displacement detector device to detect when the actuator displacement approaches a desired maximum/minimum value and a device to modify the velocity demand signal which operates in response to the control signal generated by the displacement detector device to bring the extension/contraction of the actuator gradually to a stop as the desired maximum/minimum value is reached.

4 Claims, 4 Drawing Sheets

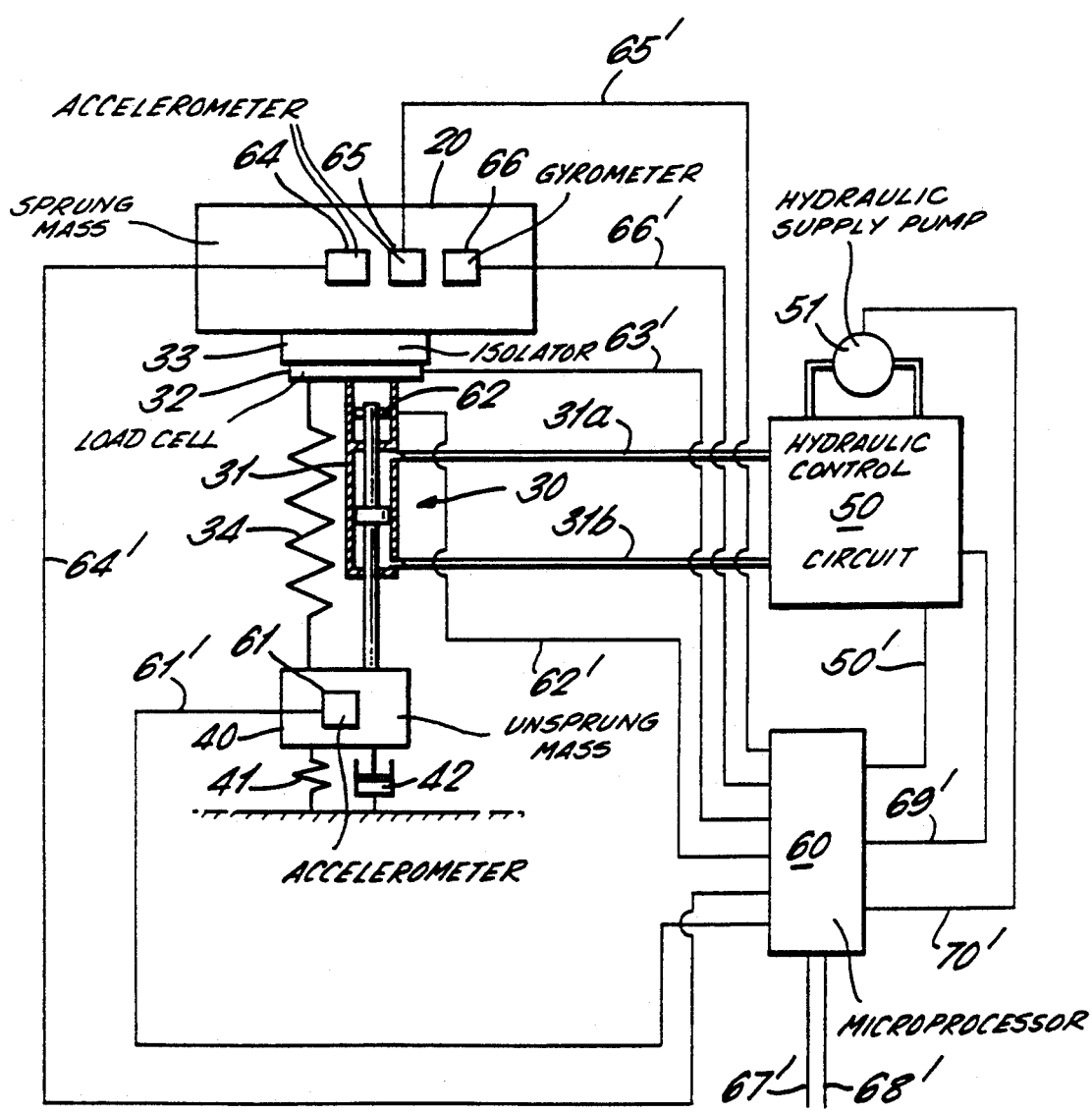

VEHICLE SUSPENSION SYSTEM

BACKGROUND OF THE INVENTION

This invention relates to a vehicle suspension system and particularly to a wheeled land vehicle suspension system.

In wheeled land vehicles it is common practice to provide a suspension system which serves to support the wheel and hub assemblies for movement relative to the chassis or body of the vehicle, with some form of springing being provided between each wheel and hub assembly and the chassis or body.

Under certain circumstances it can happen that a wheel and hub assembly reaches the limit of its possible movement towards the chassis or body, and in order to prevent the possibility of damage in such circumstances vehicles are generally provided with so-called 'bump stop' in the form of a resilient member, often of rubber, against which part of the wheel and hub assembly strikes at the limit of its movement towards the chassis or body.

A disadvantage of such known bump stop arrangements is that striking of the wheel and hub assembly against the resilient member can occur with a high force resulting in jarring of the vehicle, and that after striking the resilient member the wheel and hub assembly rebounds, thus adversely affecting the ride quality and handling characteristics of the vehicle.

Recently vehicles have been developed having so-called active suspension systems (see for example EP-A-0114757 and U.S. Pat. No. 4,761,022) which utilize wheel and hub assembly suspension devices in the form of hydraulic actuators by which the wheel and hub assemblies are mounted to the chassis or body. These suspension devices are controlled by signals representing various movement parameters of the vehicle, such as heave, pitch, roll and warp modes of movement of the vehicle, and speed, and lateral and longitudinal acceleration of the vehicle, to obtain a desired ride quality and attitude for the vehicle under all driving conditions, the control signals being derived from appropriate transducers located at appropriate positions on the vehicle. In the system disclosed in U.S. Pat. No. 4,761,022 control signals are also obtained from steering angle and yaw rate sensors on the vehicle, the signals from these sensors being used to control the steering characteristics of the vehicle.

SUMMARY OF THE INVENTION

According to the present invention there is provided a suspension unit of a wheeled vehicle comprising a hydraulic actuator of which the displacement is variable by control of the flow of hydraulic fluid to at least one side of the piston and cylinder, a device to connect the actuator to the body and a wheel hub of the vehicle so that variation of the displacement of the actuator controls the height of the body above the wheel hub, transducers on the vehicle which generate signals indicative of one or more of force applied to the body of the actuator, longitudinal acceleration of the vehicle, lateral acceleration of the vehicle, speed of the vehicle and yaw rate of the vehicle, a control device to control the flow of fluid to and from the actuator, in response to signals generated by the transducers to control the vehicle suspension, said control device comprising a processor which generates a velocity demand signal which corresponds to a velocity required of the actuator and a hydraulic control circuit controlled by the velocity demand signal, a displacement detector device to detect when the actuator length approaches a desired maximum/minimum value and a device to modify the velocity demand signal which operates in response to the control signal generated by the displacement detector device to bring the extension/contraction of the actuator gradually to a stop as the desired maximum/minimum value is reached.

Preferably, the device to modify the velocity demand signal acts only as the actuator approaches a limit and not as the actuator moves away from a limit. The device to modify the velocity demand signal preferably comprises a device to weight the velocity demand signal selectively as a function of the displacement of the actuator and/or the value of the velocity demand signal.

Preferably the suspension unit of the invention is included in an active suspension system for a vehicle.

BRIEF DESCRIPTION OF THE DRAWINGS

This invention will now be disclosed by way of example with reference to the drawings, in which:

FIG. 3 is a schematic representation of a portion of an active suspension control system for a vehicle;

DETAILED DESCRIPTION OF THE PREFERRED EMBODIMENTS

Figure 1:
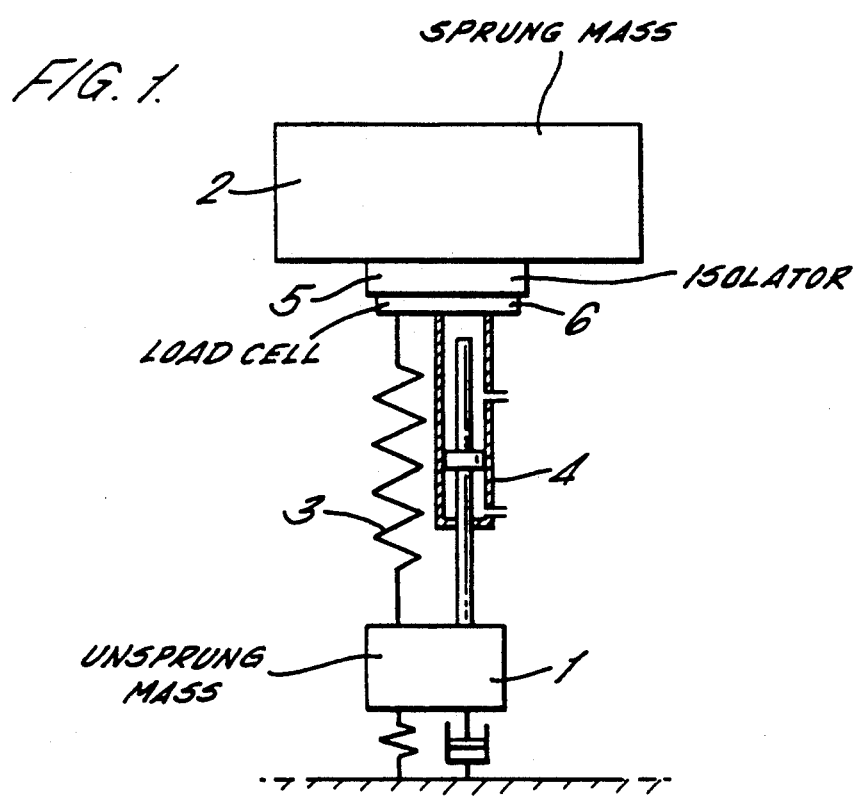
FIG. 1 is a diagrammatic view of a suspension system for one wheel of a wheeled land vehicle to which the invention can be applied.

FIG. 1 shows an unsprung mass 1 comprising a wheel and hub assembly of a wheeled land vehicle mounted to the sprung mass 2 of the vehicle, comprising the chassis and/or body of the vehicle, by means of a spring 3 and a suspension device 4 in the form of a double-acting hydraulic actuator. An isolator 5 and a load cell 6 are located between the spring 3 and actuator 4 and the sprung mass 2.

In operation the actuator 4 is controlled by signals derived from movement parameters of the vehicle obtained from appropriate transducers, including the load cell 6, to give the vehicle required ride quality and handling properties.

This operation is fully described in the prior specifications mentioned above and will not therefore be described in detail herein.

When a suspension system as shown in FIG. 1 is used in a system according to the invention the actuator 4 is controlled by signals indicative of a sub-range of movement of the unsprung mass 1 towards the sprung mass 2 to bring such movement to a controlled stop, thereby limiting jarring and possible damage to the system. This operation is achieved by appropriate programming of the processing means processing the movement parameter signals obtained from the transducers mentioned above. Thus, the relative movement between the masses 1 and 2 is brought to a controlled stop.

Referring to FIG. 3, there is shown a schematic representation of a control system according to the invention.

The arrangement of FIG. 3 represents one quarter of the control system of a four-wheeled vehicle, one unsprung mass in the form of a wheel/hub assembly being shown, the system for the remaining three unsprung masses being similar.

In FIG. 3, the sprung mass of the vehicle in the form of the vehicle body 20 is shown supported on a number of suspension components indicated generally by the reference sign 30, which are in turn supported on a wheel and tire modelled as an unsprung mass 40 in the form of the wheel/hub assembly supported on a spring 41 and damper 42 representing the tire characteristics.

The suspension components 30 comprise means for applying forces to control the attitude of the vehicle, in the form of an hydraulic actuator 31 shown vertically aligned and secured at its upper end to a load cell 32 which is separated from the vehicle body 20 by an isolator 33, which may be, for example, a rubber block. The actuator 31 need not necessarily be vertically aligned, depending on the space available for suspension components and the suspension layout adopted. The load cell 32 is capable of measuring at least a portion of the loads acting between the wheel/hub assembly and the vehicle body and producing a signal proportional to the loads.

A spring 34 is shown connected in parallel with the hydraulic actuator 31.

The spring 34 does not control the attitude of the vehicle in the way that it would in a vehicle having a conventional suspension system. Road spring 34 serves merely to reduce the power consumption of the control system of the invention by bearing a significant proportion of the static load of the vehicle body 20.

Thus, the operation of actuator 31 may take place over a wide range of displacements actually to effect control of the vehicle without requiring an excessive power consumption as would normally be required if the actuator were to support the static load of the vehicle body 20 in addition to controlling the steady state and dynamic loadings resulting from dynamic and steady state forces acting on the vehicle in motion.

Since the power consumption of actuator 31 is reduced, by the use of spring 34, its piston area may be designed to be relatively small, thereby producing a compact device. Further, spring 34 serves as a fail-safe device in that it supports the static load of the vehicle body 20 in the event of total failure of the control system of the invention.

The input and output ports of the hydraulic actuator 31 are connected via hydraulic pipework 31a and 31b to a hydraulic control circuit 50 including a suitable supply pump 51. The hydraulic circuit 50 operates, via electrical connection 50', under the command of a microprocessor 60 which produces a demanded output of the actuator 31 in response to a number of measured inputs.

The inputs to the microprocessor 60 are as follows:

Line 61' carries the output of accelerometer 61 measuring the vertical acceleration of the unsprung mass 40;

Line 62' carries the output of linear variable inductive transformer (LVIT) 62 measuring the displacement of actuator 31;

Line 63' carries the output of load cell 32 measuring the force transmitted to sprung mass 20 via the suspension components 30;

Line 64' carries the output of accelerometer 64 located near the sprung mass center of gravity and measuring the sprung mass longitudinal acceleration;

Line 65' carries the output of accelerometer 65 located near the sprung mass center of gravity and measuring the sprung mass lateral acceleration;

Line 66' carries the output of gyrometer 66 located near the sprung mass center of gravity and measuring the sprung mass yaw rate (i.e. rotational velocity);

Line 67' carries a vehicle speed signal from measuring means (not shown);

Line 68' carries a steering rack displacement signal from measuring means (not shown);

Line 69' carries a hydraulic system pressure signal from measuring means (not shown); and Line 70' carries swash plate angle signal from measuring means (not shown) located in the pump 51.

The load cell 32 measures the net load acting between the upper end of actuator 31 and the vehicle body 20. This load is, consequently, representative of the road input to the vehicle in that a force due to a wheel of the vehicle encountering a bump or dip in the road is at least partly transmitted to the vehicle body via load cell 32. However, the load measured by load cell 32 generally includes spurious force measurements which it is not required to process, and further does not include any allowance for elements of the force due to the wheel encountering a bump or dip which are transmitted to the body via parallel load paths not including the load cell 32 itself. These may be taken in to account by modification of the operation in the control system.

The microprocessor 60 of FIG. 3 is capable of resolving the forces measured at each of a number of load cells 32 into a plurality of modal forces corresponding to the modes of vehicle displacement described above acting on the vehicle body. Clearly, in the case of a four-wheeled vehicle, the number of measured forces at the load cells 32 associated respectively with each wheel/hub assembly is four.

The microprocessor first processes the signals it receives from the lines 65', 66', 63', 61' and 64'. The measurements transmitted by the lines are resolved into modal forces acting on the vehicle, some attributable to the driving conditions experienced by the vehicle (for instance forces experienced on cornering and forces due to braking) and some attributable to road conditions, that is to say forces imposed on the vehicle by reason of perturbations in the road over which it travels, and the detailed operation may be as described in EP 0114757 or in U.S. Pat. No. 4,761,022 and will not be described in detail. The processor 60 has an output signal DX1 mod which corresponds to the velocity required of a particular actuator to deal with road conditions.

Figure 4:
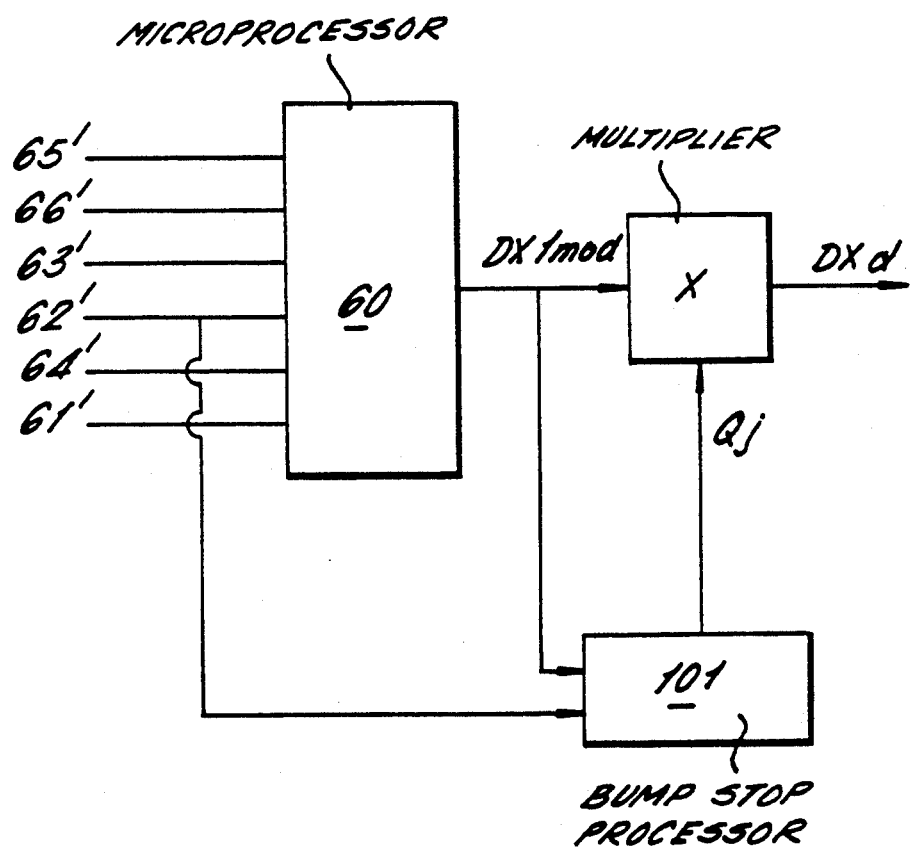
FIG. 4 is a schematic representation of a part of an active control system for a vehicle including the control system of the present invention.

The signal DX1 mod is then multiplied by a weighting factor Qj which is determined by a 'bump stop' processor 101 as can be seen in FIG. 4. The weighting factor Qj is calculated from the value of the DX1 mod signal and the position of the actuator which is the signal 62'.

The processor operates according to an algorithm which will be described below and the object of the algorithm is to constrain the actuator to operate within specified stroke limits and to bring the actuator to rest smoothly with minimal increase in deceleration and rate of change of deceleration as the actuator nears the stroke limits.

A first algorithm is given to Table 1 below:

| Qj := 1 | Initialise Qj |
|---------|---------------|

| | |
|---|---|
| tst := ABS [DX mod * Qj] | Set the test function tst |
| IF tst < DX min OR DX mod * X > O THEN | Test for possible reduced Qj |
|   IF ABS(X) > Xmax THEN Qj:= O | If the actuator is out of range, then clear Qj |
|   ELSE | ELSE |
|   IF ABS(X) > Bdry THEN | Final test for reduced Qj |
|     XR = [ABS(X) − Bdry]/[Xmax − Bdry] | Compute position ratio |
|     Vr = ABS(DX mod)/Dxmax | Compute velocity ratio |
|     IF VR>1 THEN Vr := 1 | Make velocity ratio< = 1 |
|     Qj := Qj* {1−Xr*[Xr+Vr* (1−Xr)]} | Compute the reduced value of Qj |
|   END IF | |
|   END IF | |
| END IF | |

Figure 2:
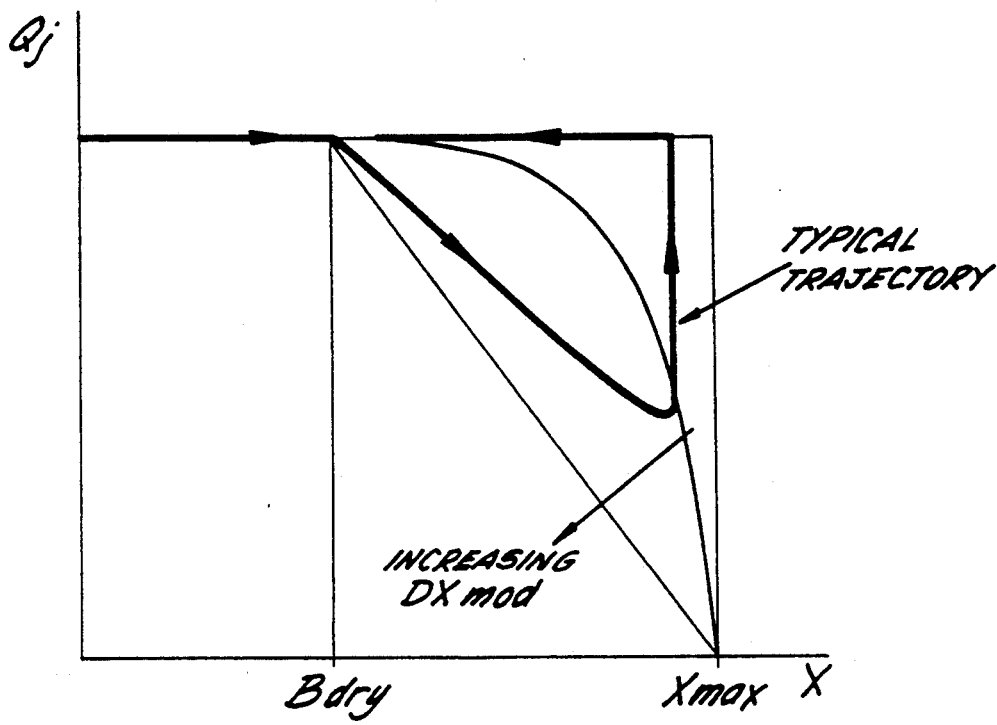
FIG. 2 and 2a are graphs illustrating operation of the system of FIG. 1 in accordance with the invention.

Notes on Table 1
Where the terms above are qualified by the prefix ABS then the values of the terms considered by the processor 101 were absolute values.
The above alogorithm follows a "square law" reduction in Qj at low velocity demands, a "linear law" at very high velocity demands, and a combination of the two at intermediate velocity demands. FIG. 2 illustrates the control law.
Bdry is the actuator position boundary at which the value of Qj ceases to be unity.
Xmax defines the envelope of actuator motion.
DXmin is the lowest significant value of velocity demand. It is set to prevent the algorithm switching between zero and unity when X = Xmax and DX1mod contains only "noise".
DXmax is the highest significant value of velocity demand. It is used to define the velocity above which Qj follows a "linear law", and is an arbitrarily chosen value above which the velocity demand is considered to be high.

In the algorithm the actuator position X is calculated from the signal 62' as being the distance from mid-point of the stroke.

If one looks in detail at the algorithm it will be seen that the algorithm has no effect (i.e. Qj=1) if either the actuator is travelling toward mid-stroke (the sum of DX mod x X will be greater than 0 if DX mod and X are either both positive or both negative) or if the absolute value of the actuator position from the mid-point is less than a specified value (Bdry). The value of Qj is reduced successively if the actuator is travelling away from the mid-stroke and the absolute value of the actuator position increases to a value greater than Bdry. The value of Qj is reduced to zero when the absolute value of the actuator position reaches X max.

As an alternative to measuring the actuator position from the signal 62' the position could be measured from a simulated model of the actuator if such is incorporated into the main control circuitry.

An alternative algorithm is set out now in Table 2:

TABLE 2

Alternative Bump Stop Algorithm.

| | |
|---|---|
| Qj := 1 | Initialise Qj |
| tst :=ABS [DXmod*Qj] | Set the test function tst |
| IF tst < DXmin OR DXmod*X > 0 THEN | Test for possible reduced Qj range, |
|   IF ABS(X) > Xmax THEN Qj := O | If the actuator is out of range, then clear Qj |
|   ELSE | ELSE |
|   IF ABS(X) > Bdry THEN | Final test for reduced Qj |
|     XR= [ABS(X) − Bdry]/[Xmax − Bdry] | Compute position ratio |
|     Qj := Qj* [1−Xr$^4$] | Compute the reduced value of Qj |
|   END IF | |
|   END IF | |

TABLE 2-continued

Alternative Bump Stop Algorithm.

| |
|---|
| END IF |

Figure 2A:
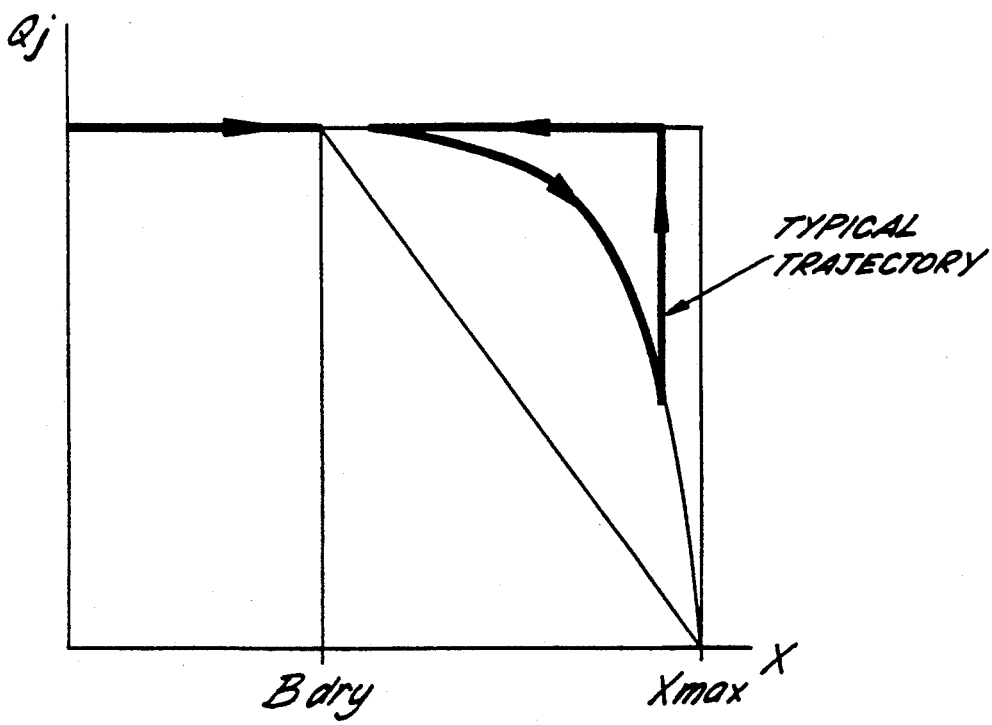

Notes on Table 2
As with Table 1 ABS [X] is the absolute value of X, ABS [DX1mod*Qj] is the absolute value of Qj, etc.
The above algorithm follows a "fourth power law" reduction in Qj. FIG. 2a illustrates the control law.
Bdry is the actuator position boundary at which the value of Qj ceases to be unity.
Xmax defines the envelope of actuator motion.
DXmin is the lowest significant value of velocity demand. It is set to prevent the algorithm switching between zero and unity when X = Xmax and DX1mod contains only "noise".

It will be seen that FIG. 2 illustrates the operation of the algorithm in Table 1 and FIG. 2a illustrates the operation of the algorithm in Table 2.

It will be noted from both of the tables that the signal DX1 mod is not modified in any way if the signal is such as to move the actuator towards its mid-position and this means that there is no modification of the signal as the actuator returns from the 'bump'.

Although as described in FIG. 2 the system of the invention operates to control relative movement of the mass 1 towards the mass 2 thereby replacing a conventional bump stop as described above, it will be appreciated that the system has the further advantage that it can also operate in a similar manner for relative movement of the mass 1 away from the mass 2, with curves of FIG. 2 being repeated on the other side of the vertical axis.

Further although as described curve X is parabollic in shape it will be appreciated that by appropriate programming of the signal processing means the curve can otherwise be of any desired shape as can the curves Y and Z also.

The preferred embodiments of the invention disclosed above are preferably incorporated in an active suspension system of a vehicle such that the processing is carried out by the central control unit of the system. However, it is envisaged by the applicant that an individual suspension unit could be associated with each hub and wheel assembly of the vehicle. Each unit would receive signals from the central control system of the vehicle but each unit would be an individual entity rather than a part of the main processor of the control system. The advantage of such an embodiment would be that it would allow a simplified main processor.

What is claimed is:

1. A suspension unit of a wheeled vehicle comprising:
   a hydraulic actuator of which the displacement is variable by control of the flow of hydraulic fluid to at least one side of the piston and cylinder thereof;
   means to connect the actuator to the body and a wheel hub of the vehicle so that variation of the displacement of the actuator controls the height of the body above the wheel hub;
   transducers on the vehicle which generate signals, each transducer providing a signal indicative of at least one of force applied to the body by the actuator, longitudinal acceleration of the vehicle, lateral acceleration of the vehicle, speed of vehicle and yaw rate of the vehicle;
   control means to control the flow of fluid to and from the actuator, in response to the signals generated by the transducers, to control the vehicle suspension, said control means comprising a processor which generates a velocity demand signal which corresponds to a velocity required of the actuator and a hydraulic control circuit controlled by the velocity demand signal;
   displacement detector means to detect when the actuator displacement approaches a desired maximum/minimum value and to generate a control signal when the actuator displacement approaches the desired maximum/minimum value; and
   means to modify the velocity demand signal which operates in response to the control signal generated by the displacement detector means to being the extension/contraction of the actuator gradually to a stop as the desired maximum/minimum value is reached.

2. A suspension unit as claim in claim 1 wherein the actuator has a mid-position of displacement and the means to modify the velocity demand signal determines whether the velocity demand signal requires displacement of the actuator toward or away from the mid-position and only modifies the velocity demand signal when the velocity demand signal requires displacement of the actuator away from the mid-position.

3. A suspension unit as claimed in claim 1 wherein said means to modify the velocity demand signal comprises means to weight the velocity demand signal selectively as a function of at least one of the displacement of the actuator and the value of the velocity demand signal.

4. A suspension unit as claimed in claim 1 is included in an active suspension system for a vehicle having a plurality of wheel hubs and a body comprising a plurality of the suspension units with the actuator of each suspension unit connected between each wheel hub of the vehicle and the body.

* * * * *